United States Patent
Pashintsev et al.

(10) Patent No.: US 12,505,861 B1
(45) Date of Patent: Dec. 23, 2025

(54) IMMERSIVE VIDEO EDITOR WITH GenAI DRIVEN TEXT-TO-VOICE MODIFICATIONS AND VISUAL AUGMENTATION

(71) Applicant: mmhmm inc., Bentonville, AR (US)

(72) Inventors: Alexander Pashintsev, Cupertino, CA (US); Phil Libin, Bentonville, AR (US); Vitalii Glazkov, Santiago (CL); Leonid Kitainik, San Jose, CA (US)

(73) Assignee: mmhmm inc., Bentonville, AR (US)

( * ) Notice: Subject to any disclaimer, the term of this patent is extended or adjusted under 35 U.S.C. 154(b) by 0 days.

(21) Appl. No.: 18/955,388

(22) Filed: Nov. 21, 2024

Related U.S. Application Data (60) Provisional application No. 63/602,108, filed on Nov. 22, 2023.

(51) Int. Cl.

| | |
|---|---|
| *G11B 27/036* | (2006.01) |
| *G06T 3/40* | (2006.01) |
| *G06T 11/00* | (2006.01) |
| *G06T 13/80* | (2011.01) |
| *G06V 30/413* | (2022.01) |
| *G10L 15/18* | (2013.01) |
| *G10L 25/57* | (2013.01) |
| *G06V 20/20* | (2022.01) |

(52) U.S. Cl.
CPC .............. *G11B 27/036* (2013.01); *G06T 3/40* (2013.01); *G06T 11/00* (2013.01); *G06T 13/80* (2013.01); *G06V 30/413* (2022.01); *G10L 15/1815* (2013.01); *G10L 25/57* (2013.01); *G06V 20/20* (2022.01)

(58) Field of Classification Search
CPC ...... G11B 27/036; G06V 30/413; G06T 3/40; G06T 11/00; G06T 13/80; G10L 15/1815; G10L 25/57

See application file for complete search history.

(56) References Cited

U.S. PATENT DOCUMENTS

| 11,334,622 B1 * | 5/2022 | Buckley | G11B 27/031 |
|---|---|---|---|
| 2020/0090661 A1 * | 3/2020 | Ackerman | G06V 40/172 |
| 2020/0251089 A1 * | 8/2020 | Pinto | A63F 13/54 |
| 2021/0056348 A1 * | 2/2021 | Berlin | G06N 3/0985 |
| 2021/0090592 A1 * | 3/2021 | Lee | G10L 15/26 |
| 2023/0205985 A1 * | 6/2023 | Zhu | G10L 15/22 |
| | | | 704/235 |

* cited by examiner

*Primary Examiner* — Mishawn N. Hunter
(74) *Attorney, Agent, or Firm* — Westborough IP Group, LLC (57) ABSTRACT

Using generative AI to modify a video presentation includes using a speech-to-text component to provide a transcript of fragments of the video presentation, the generative AI reviewing the transcript of fragments to provide improvements that enhance the consistency, style, content, and expressive qualities of fragments from the transcript of fragments, and the generative AI creating adjustments of an audio portion of the video presentation based on the improvements. Using generative AI to modify a video presentation also includes providing a modified video presentation by inserting the synthesized speech into the video presentation and replacing audio corresponding to at least one fragment of the transcript of fragments with the synthesized speech, and/or deleting at least at least a portion of the audio of the at least one fragment of the transcript of fragments. The generative AI supplements the modified video presentation with one or more visual augmentations.

20 Claims, 7 Drawing Sheets

IMMERSIVE VIDEO EDITOR WITH GenAI DRIVEN TEXT-TO-VOICE MODIFICATIONS AND VISUAL AUGMENTATION

CROSS-REFERENCE TO RELATED APPLICATIONS

This application claims priority to U.S. Prov. App. No. 63/602,108, filed on Nov. 22, 2023, and entitled "IMMERSIVE VIDEO EDITOR WITH GENAI DRIVEN TEXT-TO-VOICE MODIFICATIONS AND VISUAL AUGMENTATION", which is incorporated herein by reference.

TECHNICAL FIELD

This application is directed to the field of information processing, video recording, and video editing, and more specifically to building an immersive video editor with text-to-voice modifications and video augmentation driven by GenAI.

BACKGROUND OF THE INVENTION

Video content has firmly established its role as a key productivity, education, electronic commerce, and entertainment medium, as well as the leading Internet medium. Video streaming is estimated to account for 91% of global internet traffic by the end of 2024. The average internet user has consumed over 100 minutes of online video content per day in 2024. To understand more about a product or service, 91% of consumers watch an explainer video. According to a 2022 Global Internet Phenomena Report, data usage from video sites increased by 24% year-over-year. By the end of 2023, video has accounted for 82% of all content generation, a 15-fold increase from 2017.

The emergence of remote and hybrid work models has significantly affected the enterprise and team communication style. As of 2023, over 40% of worldwide employees have been enjoying fully or partially remote work, with 12.7% fully remote and 16% of companies working partially remotely. Upwork estimates that 32.6 million Americans, or about 22% of the US workforce, will still be working remotely by 2025. Remote work is also on the rise in Australia, Canada, New Zealand, the United Kingdom; the U.S. has one of the highest rates of remote work after New Zealand and Canada.

Accordingly, the asynchronous, pre-recorded videos created by employees and other presenters and shared within corporations are complementing video conferencing and gaining popularity as a productive and flexible communication tool for distributed enterprises and teams. Such videos may be watched by individual viewers with flexible time arrangements; watched by groups of viewers and watch parties, scheduled at mutually agreed upon times, or joined ad hoc. Pre-recorded videos may also complement the traditional synchronous video conferencing.

Advanced video authoring software, such as mmhmm, Loom, Zoom, Vimeo, and other video tools, facilitate creation of immersive asynchronous presentation videos, where presenters are embedded into the presentation flow with the ability to interact with slides and other presentation materials, change their position, transparency, color, and other visual characteristics, and offer viewers enhanced presentation experiences.

Generative AI technologies based on large language models and advanced machine learning techniques gave birth to a new breed of video authoring tools, which are increasingly used in semi-automatic video creation and editing. The list of popular applications includes Descript, Synthesia, Visla, Peech and many more tools that create videos from scripts, edit videos by editing scripts, convert long-form content into short-form videos, etc.

With the proliferation of asynchronous video presentation as a leading content type for team and corporate communications, their express usage as "digital napkin notes" for instant delivery of new ideas, explanations, designs, inventions, and other types of content will significantly increase, and time interval between video creation and its consumption by target users may shrink to hours, if not minutes.

SUMMARY OF THE INVENTION

Notwithstanding a significant progress in building a new generation of video authoring tools, the proliferation of accelerated consumption cycles for pre-recorded videos creates many challenges, since the presenters (authors) may have very limited time for editing and polishing video presentations created from a stack of logically organized presentation materials (slides and other illustrations) that are verbally explained by a presenter and designated for a nearly instant demonstration or asynchronous consumption by viewers.

Accordingly, it is important to develop new methods of express video editing for asynchronous videos.

According to the system described herein, using generative AI to modify a video presentation includes using a speech-to-text component to provide a transcript of fragments of the video presentation, the generative AI reviewing the transcript of fragments to provide improvements that enhance the consistency, style, content, and expressive qualities of fragments from the transcript of fragments, and the generative AI creating adjustments of an audio portion of the video presentation based on the improvements. The adjustments include modifications to at least some text of the transcript of fragments, truncation of at least some of the text of the transcript of fragments, and/or new text that is added to the text of the transcript of fragments. The new text and the modifications to text are provided using synthesized speech that emulates emotional and acoustic aspects of speech of a presenter of the video presentation. Using generative AI to modify a video presentation also includes providing a modified video presentation by inserting the synthesized speech into the video presentation, replacing audio corresponding to at least one fragment of the transcript of fragments with the synthesized speech, and/or deleting at least at least a portion of the audio of the at least one fragment of the transcript of fragments. The generative AI supplements the modified video presentation with one or more visual augmentations. The presenter may provide suggestions for some of the improvements. The visual augmentations may include an image of the presenter. The image of the presenter may be static or dynamic. The image of the presenter may include characteristic posture, facial expression, and/or gesture. At least some of the visual augmentations may provide additional text. The additional text may be an animated text line that is synchronized with a corresponding portion of the modified video presentation. The visual augmentations may include an enlarged version of a slide provided in the modified video presentation. The enlarged version of the slide may correspond to zooming in certain portions of the slide. The visual augmentations may include zooming out all slides of the modified video presentation, highlighting portions of materials of the modified video presentation, and/or marking up the portions of the materials of the modified video presentation. The visual augmentations may include a marked-up version of a slide provided in the modified video presentation. The visual augmentations may include a dynamic background that changes, changing color effects, and/or changing foreground imagery. The adjustments may include the generative AI replacing a particular fragment of the transcript in response to a selected metric of semantic difference between a corresponding one of the improvements and the particular fragment of the transcript exceeding a predefined threshold. The selected metric of semantic difference may correspond to a distance in a metric vector space between vector embeddings of the particular fragment and the corresponding one of the improvements exceeding a length of a vector embedding of the particular fragment by at least 20%. The adjustments may include deleting at least a portion of a fragment of the transcript of fragments that is proximal to an other fragment of the transcript of fragments that contains an other portion with similar information. The adjustments may include deleting at least a portion of a fragment of the transcript of fragments that contains textual errors. The textual errors may include incomplete phrases. The adjustments may include adding at least one fragment to the transcript of fragments that includes a brief summary of one or more other ones of the fragments of the transcript of fragments. The adjustments may include adding at least one fragment to the transcript of fragments that includes expanding object explanations of one or more other ones of the fragments of the transcript of fragments.

According further to the system described herein, a non-transitory computer readable medium contains software that, when executed by a processor, uses generative AI to modify a video presentation. The software includes executable code that uses a speech-to-text component to provide a transcript of fragments of the video presentation, executable code that uses the generative AI to review the transcript of fragments to provide improvements that enhance the consistency, style, content, and expressive qualities of fragments from the transcript of fragments, and executable code that uses the generative AI to create adjustments of an audio portion of the video presentation based on the improvements. The adjustments include modifications to at least some text of the transcript of fragments, truncation of at least some of the text of the transcript of fragments, and/or new text that is added to the text of the transcript of fragments. The new text and the modifications to text are provided using synthesized speech that emulates emotional and acoustic aspects of speech of a presenter of the video presentation. The software also includes executable code that provides a modified video presentation by inserting the synthesized speech into the video presentation, replacing audio corresponding to at least one fragment of the transcript of fragments with the synthesized speech, and/or deleting at least at least a portion of the audio of the at least one fragment of the transcript of fragments. The software also includes executable code that uses the generative AI to supplement the modified video presentation with one or more visual augmentations. The presenter may provide suggestions for some of the improvements. The visual augmentations may include an image of the presenter. The image of the presenter may be static or dynamic. The image of the presenter may include characteristic posture, facial expression, and/or gesture. At least some of the visual augmentations may provide additional text. The additional text may be an animated text line that is synchronized with a corresponding portion of the modified video presentation. The visual augmentations may include an enlarged version of a slide provided in the modified video presentation. The enlarged version of the slide may correspond to zooming in certain portions of the slide. The visual augmentations may include zooming out all slides of the modified video presentation, highlighting portions of materials of the modified video presentation, and/or marking up the portions of the materials of the modified video presentation. The visual augmentations may include a marked-up version of a slide provided in the modified video presentation. The visual augmentations may include a dynamic background that changes, changing color effects, and/or changing foreground imagery. The adjustments may include the generative AI replacing a particular fragment of the transcript in response to a selected metric of semantic difference between a corresponding one of the improvements and the particular fragment of the transcript exceeding a predefined threshold. The selected metric of semantic difference may correspond to a distance in a metric vector space between vector embeddings of the particular fragment and the corresponding one of the improvements exceeding a length of a vector embedding of the particular fragment by at least 20%. The adjustments may include deleting at least a portion of a fragment of the transcript of fragments that is proximal to an other fragment of the transcript of fragments that contains an other portion with similar information. The adjustments may include deleting at least a portion of a fragment of the transcript of fragments that contains textual errors. The textual errors may include incomplete phrases. The adjustments may include adding at least one fragment to the transcript of fragments that includes a brief summary of one or more other ones of the fragments of the transcript of fragments. The adjustments may include adding at least one fragment to the transcript of fragments that includes expanding object explanations of one or more other ones of the fragments of the transcript of fragments.

The proposed system transcribes an original presentation video, builds, or accepts from the presenter, video editing suggestions, emulates presenter voice for approved editing fragments that include new text, such as extensions or modifications, using Generative AI (GenAI) component of the system, generates visual augmentations for the new video fragments, and assembles the edited video presentation.

Various aspects of system functioning are explained as follows.

1. The use of the GenAI component of the system in the editing process is fourfold:
   a. Building editing suggestions.
   b. Emulating speech of a presenter for the new fragments of the edited video presentation.
   c. Generating visual augmentations for the edited video.
   d. Composing the edited video presentation.
2. Editing suggestions. The GenAI component of the system may process and analyze real-time presentation transcripts obtained via STT (Speech-to-Text/voice recognition technology) or prepared offline and synchronized with talk of a presenter. Subsequently, the GenAI component may build editing suggestions, broadly falling into the following types:
   a. Extensions, where new fragments of text are inserted after existing portions of the transcript to clarify the presentation content;
   b. Modifications, where portions of the existing text are replaced with edited portions, for example, for fixing pronunciation, grammatical or semantic errors;
   c. Truncations, where portions of the existing text, such as repetitions, are deleted from the presentation.

d. Combinations of the above—for example, a modification, immediately followed by an extension in the same portion of the transcript.

Alternatively, the presenter may create some or all editing suggestions without the assistance of the GenAI component and may directly edit the transcripts of fragments of the presentation talk.

3. Building editing suggestions. The mechanism of building editing suggestions for the original presentation video is based on enhancing fragments of the presentation transcript using GenAI (for example, an LLM (Large Language Model), potentially combined with a relevant RAG (Retrieval-Augmented Generation)) and analyzing differences between the original and enhanced text, with due respect to connections between the original transcript and the GenAI enhancements with the presentation visuals. which are processed to identify a hierarchical structure of the visuals (such as slides). Building editing suggestions includes the following steps:

a. Each slide is processed by an AI-enhanced image recognition component, which identifies a hierarchy of presentation objects and presentation layers created by the presenter and semi-ordered by a place of the presentation objects within a certain level of granularity of the slide presentation. For example, a text box with bullet points in large fonts, positioned near the top of a slide, may belong to a first or a second level of granularity, while a graph or chart, illustrating one of the bullet points and positioned on the same slide, may be several levels of hierarchy below the text.

The content of a slide presentation may range from a basic explanation of the slide subject, a place of the slide subject in an overall presentation and a connection of the slide subject with other slides to a detailed explanation involving multiple levels of granularity.

b. The system identifies connections between the fragments of the transcript and the slide objects the fragments of the transcript explain.

c. Each fragment of the presentation transcript associated with each slide, as well as a totality of the fragments (the whole transcript for each slide) are processed with a GenAI engine aimed at improving consistency, style and expressive qualities of the texts as customarily done by contemporary GenAI systems, such as ChatGPT Writer or Claude.

d. The generated texts are compared with the original transcripts; suggested modifications to the text of the original presentation may be based on differences between the original and the GenAI enhanced transcripts. Specifically, i. Case 2b. Modifying relatively short fragments with explanations of objects in the slide presentation hierarchy by replacing such fragments with the GenAI versions in case the difference between the original and generated texts is significant (for example, exceeding 20% of the text volume).

ii. Case 2c. Deleting closely positioned repetitions of phrases and other brief portions of text (assuming that such portions are not referring to other fragments); deleting incomplete phrases and other easily identifiable textual error;

iii. Case 2a. Adding brief summaries to slide transcripts or to relatively long object explanations within each of the slides provided such summaries are absent and the text doesn't look rounded up, subject to the GenAI assessment; or, expanding object explanations with facts absent in the transcript but easily obtainable using GenAI (LLM and, optionally, an appropriate RAG extension).

4. Emulation of speech of a presenter is a well-developed feature of GenAI technologies. New fragments of speech of a presenter (presentation talk) may be generated for extensions and modifications. Such fragments may be considering the emotional and acoustic aspects of the original presentation and may be potentially referring to the current presentation materials, such as slides.

Some GenAI-driven presentation editors attempt generation of personalized videos with talking presenters, attempting to imitate mimics, posture, gestures, and other dynamic characteristics of the presenter. The existing state of such advanced emulation technology may be considered inadequate for satisfying user experiences. Therefore, in the current system described herein, the emulated presentation text is reproduced without an attempt to reproduce the talking personalized models of the animated presenters.

5. Visual augmentations may be generated by the GenAI component as an additional expression mechanism, partially replacing the live audio-visual presenter talk in the extensions and modifications, where the emulated presenter speech is reproduced in the background. Visual augmentations may offer different types of static and dynamic imagery, visual effects, and transformations of presentation materials. Examples may include:

a. Static or dynamic image of the presenter or other individual(s) with characteristic posture, facial expression, or gesture, illustrating the presentation materials and the emulated talk of the presenter (without recreating the artificial lip movements and mimics of the talking presenter, as explained in Section 3 above).

b. Animated text line of the current edited episode (extension or modification), synchronized with the emulated talk of the presenter.

c. Static or dynamic illustrations of the talk of the presenter and/or current presentation materials, including backgrounds, color effects, foreground imagery, etc.

d. Transformations of the current presentation materials, such as zooming in certain portions of slides or zooming out all the slides; highlighting and marking up portions of presentation materials, etc., depending on the context of the emulated speech of the presenter.

6. Composing the edited video presentation includes the assembly of the full edited copy, with potential addition of a transitional graphics and/or audio between the original and the inserted fragments or between the boundaries of the truncated portions.

7. Visual augmentations may be added to the original fragments of the video presentation and to the new portions of an edited video presentation, added in the editing process, as explained elsewhere herein.

8. Participation of the presenter in the editing process may depend on the time budget of the presenter, the editing mode, and on other factors. Thus, a fully automatic editing mode may produce an edited copy without participation of the presenter and offer the copy for review, whereas a multi-variant mode may offer several options of all or some visual augmentations for choice by the presenter.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for GenAI driven editing of asynchronous presentations including generation of editing suggestions utilizing real-time transcripts for audio modifications and extensions with emulated voice of presenter(s), and video augmentations with different types of static and dynamic images, backgrounds, and running text lines.

Figure 1:
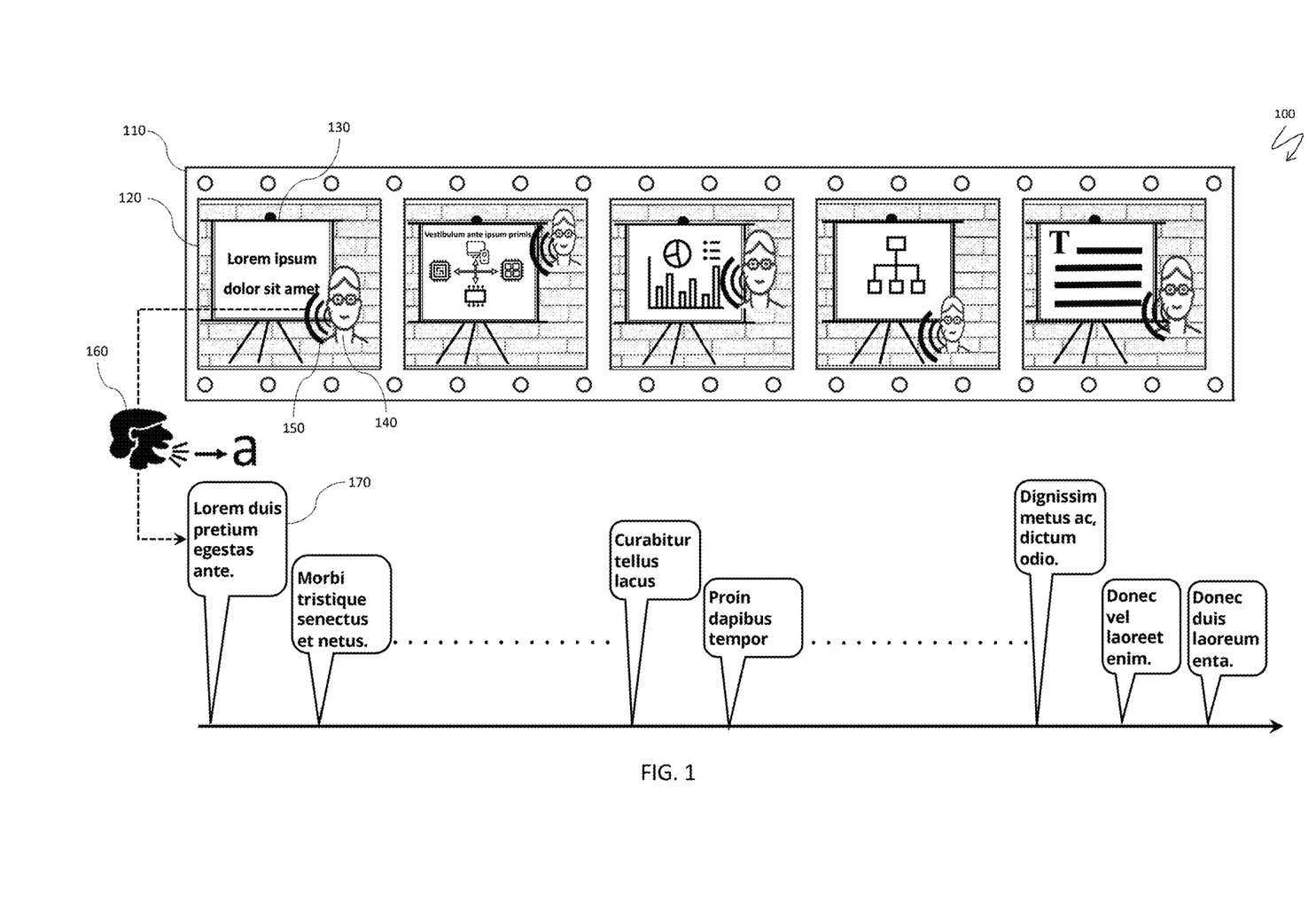
FIG. 1 is a schematic illustration of a video presentation with real-time transcripts, according to an embodiment of the system described herein.

FIG. 1 is a schematic illustration 100 of a video presentation with real-time transcripts. An original asynchronous video presentation 110 may include a fragment 120 (or multiple fragments), which may use illustrative materials such as slides 130, a presenter 140 (or multiple presenters, not shown in FIG. 1), providing a presenter talk (narration) 150. The presenter talk 150 may be processed (transcribed) by voice recognition technology 160 (STT, Speech to text) resulting in transcription fragments 170.

Figure 2:
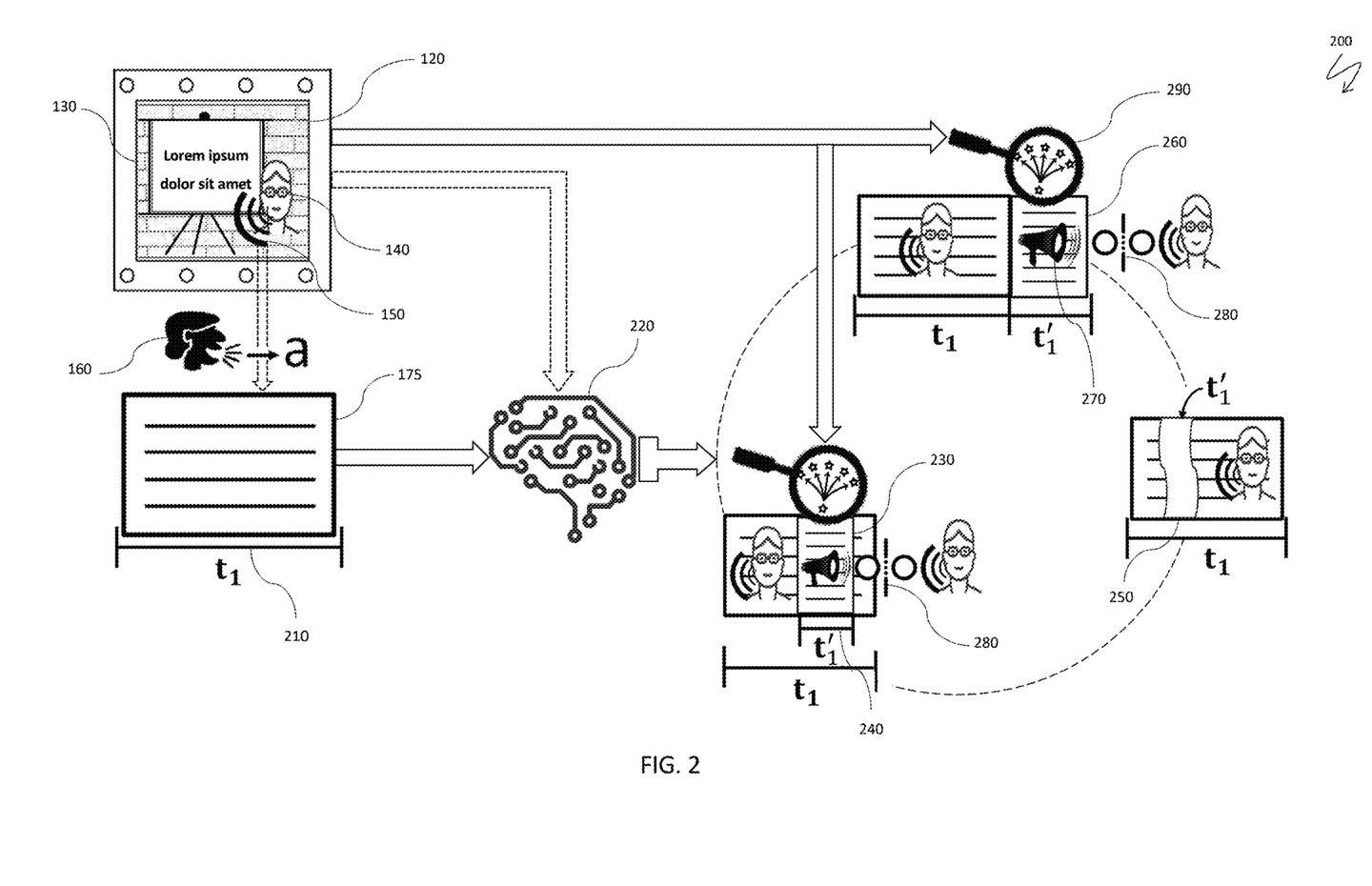
FIG. 2 is a schematic illustration of use of GenAI for express audio-video improvements, including emulation of speech of a presenter, according to an embodiment of the system described herein.

FIG. 2 is a schematic illustration 200 of use of GenAI for express audio-video improvements, including emulation of speech of a presenter. Under the notations of FIG. 1, the fragment 120 of an original video presentation contains one of the slides 130; the presenter 140 provide the presenter talk 150, and the voice recognition technology 160 transcribes the talk 150. A full transcription 175 of the presenter talk 150 for the fragment 120 has a duration 210. Text of the transcription 175 and audio of the presenter talk 150 is processed by a GenAI component 220, which may suggest and assist in audio editing of the fragment in three different ways:

Audio modification of a portion 230 of the fragment 120 (duration 240) using emulation 280 of a voice of the presenter 140. Such modification may correct the text and/or the audio parameters of the presentation.

Audio truncation of the fragment 120 by deleting a portion 250 of the presenter talk 150 and transcription. The deleted portion 250 may include unnecessary text, pauses, repetitions, etc. Certain editing may be required for smooth transition between the preceding and the following fragments of the presenter talk 150.

Audio extension of the fragment 120 adding a new portion 260 of the presentation fragment and an audio extension portion 270 of the presenter talk 150 using the emulation 280 of the voice of the presenter 140.

Audio modification and audio extension of a presentation fragment may be accompanied by a visual augmentation 290, as explained elsewhere herein.

FIGS. 3A-3E are schematic illustrations of different types of audio-visual augmentations.

Figure 3A:
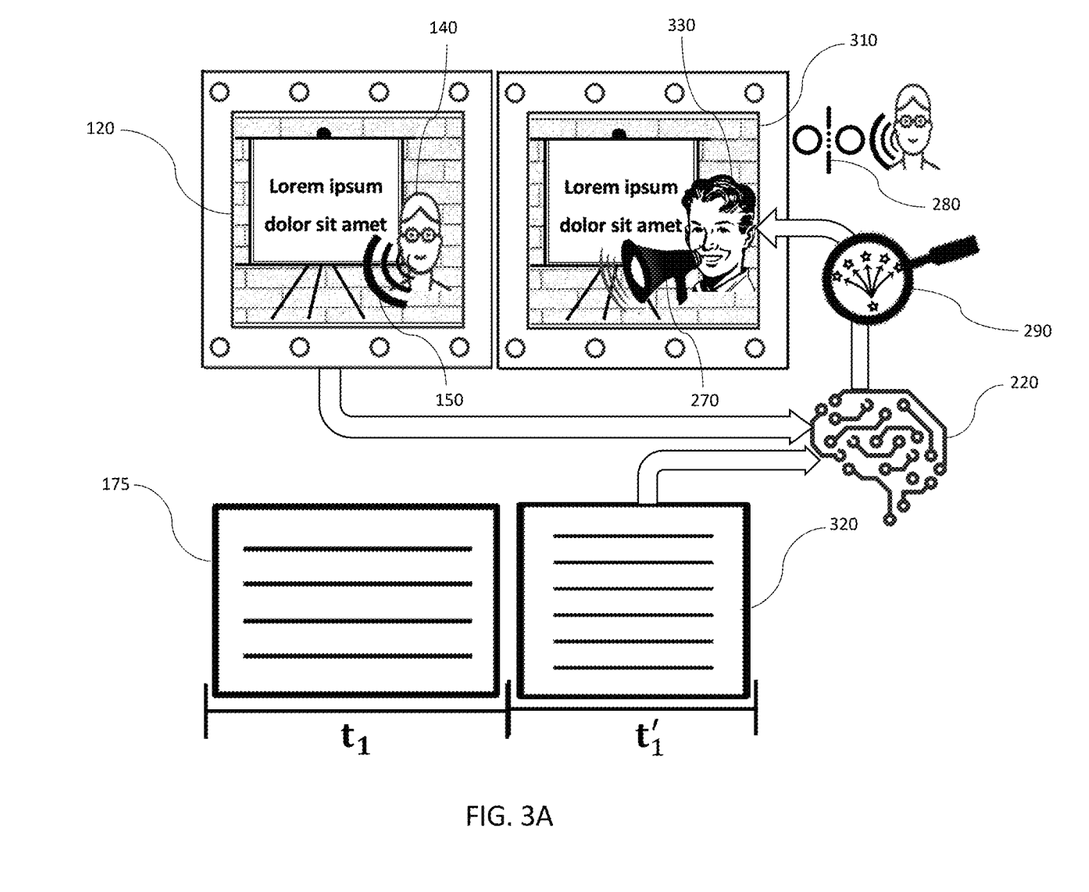
FIGS. 3A-3C are schematic illustrations of different types of video augmentations, according to an embodiment of the system described herein.

FIG. 3A schematically illustrates an audio-visual augmentation 310 associated with an audio extension (see FIG. 2 and the accompanying text for more information) and containing a static image of the presenter 140. The fragment 120 of an asynchronous video containing live images of the presenter 140, accompanied by the live talk 150 with the full transcription 175, is extended with an additional text 320. Both the fragment 120 and the additional text 320 are processed by the GenAI component 220. The audio extension portion 270 of the audio-visual augmentation 310 is built using the emulation 280 of the presenter voice, as explained in FIG. 2 and the accompanying text.

The visual augmentation component 290 adds one or multiple static images 330 of the original or an additional presenter to the audio-visual augmentation 310. Image search may be based on the emotional expression, intonation, topics, or other characteristics of the additional text 320. Such image(s) may be extracted from the original video (including live images of the presenter 140 in the fragment 120) or may be chosen or created by the multimodal GenAI component. Multiple static images may be used in the audio-visual augmentation 310 in the event when the emotional expression notably changes within the audio extension portion 270. Sentiment recognition and image search technologies are considered parts of the GenAI component.

Figure 3B:
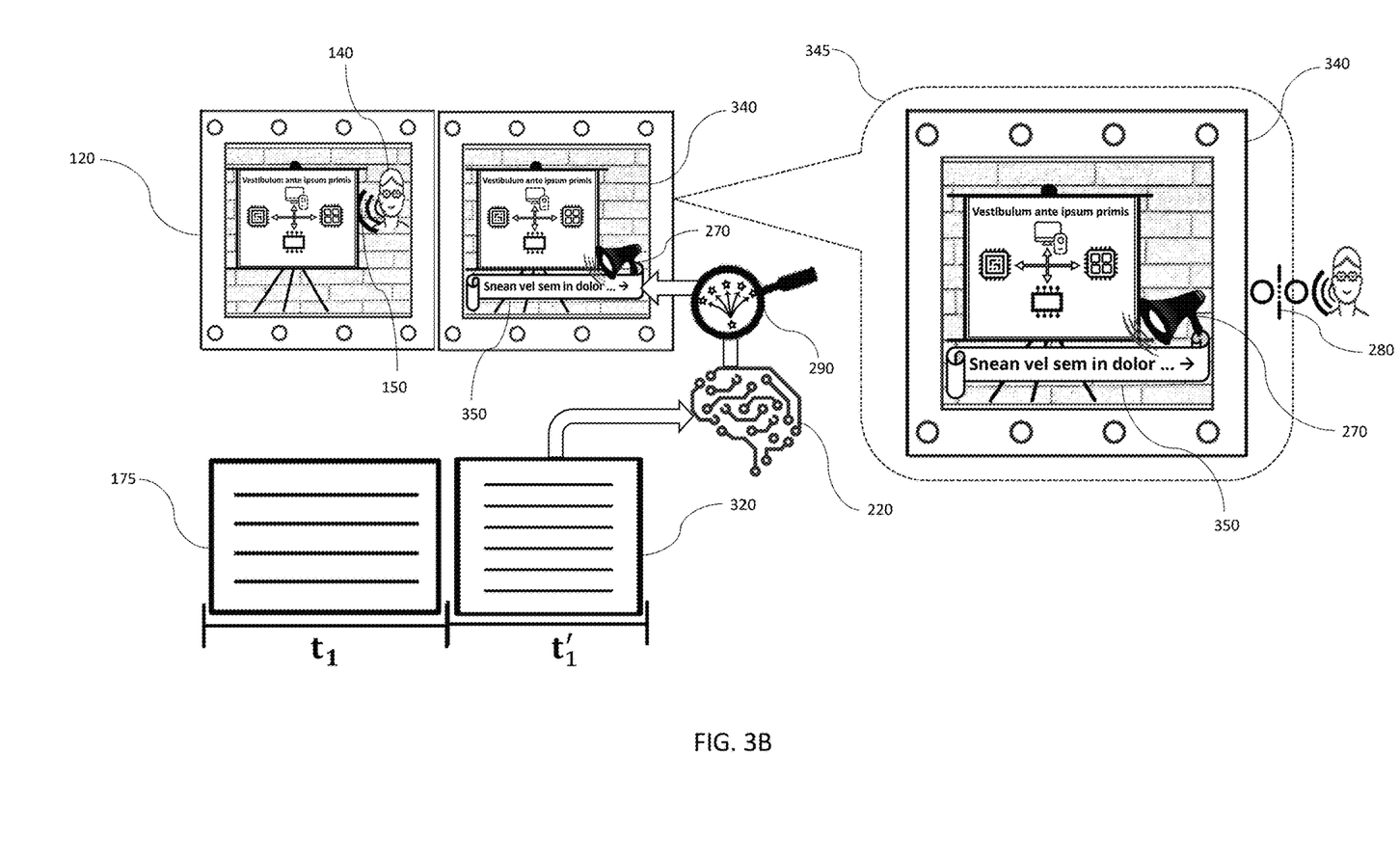

FIG. 3B is a schematic illustration of an audio-visual augmentation 340 associated with an audio extension and containing a running text line (the audio-visual augmentation 340 is shown for convenience enlarged as an item 345). Analogously to the FIG. 3A, the fragment 120 contains live images of the presenter 140 and audio of the live presenter talk 150 used to produce the full transcription 175, which is extended with the additional text 320; the additional text 320 is processed by the GenAI component 220 to generate the audio extension portion 270 using the voice emulation component 280.

Simultaneously, the visual augmentation component 290 driven by the GenAI component 220 adds a running text line 350 that may serve as a caption, subtitle, summary or alternative text to the additional text 320. The running text line 350 may include various visual effects, such as color changes reflecting the emotional expressions, still episodes, variable fonts and reproduction speed, specific sound effects such as typewriter sounds, etc.

Figure 3C:
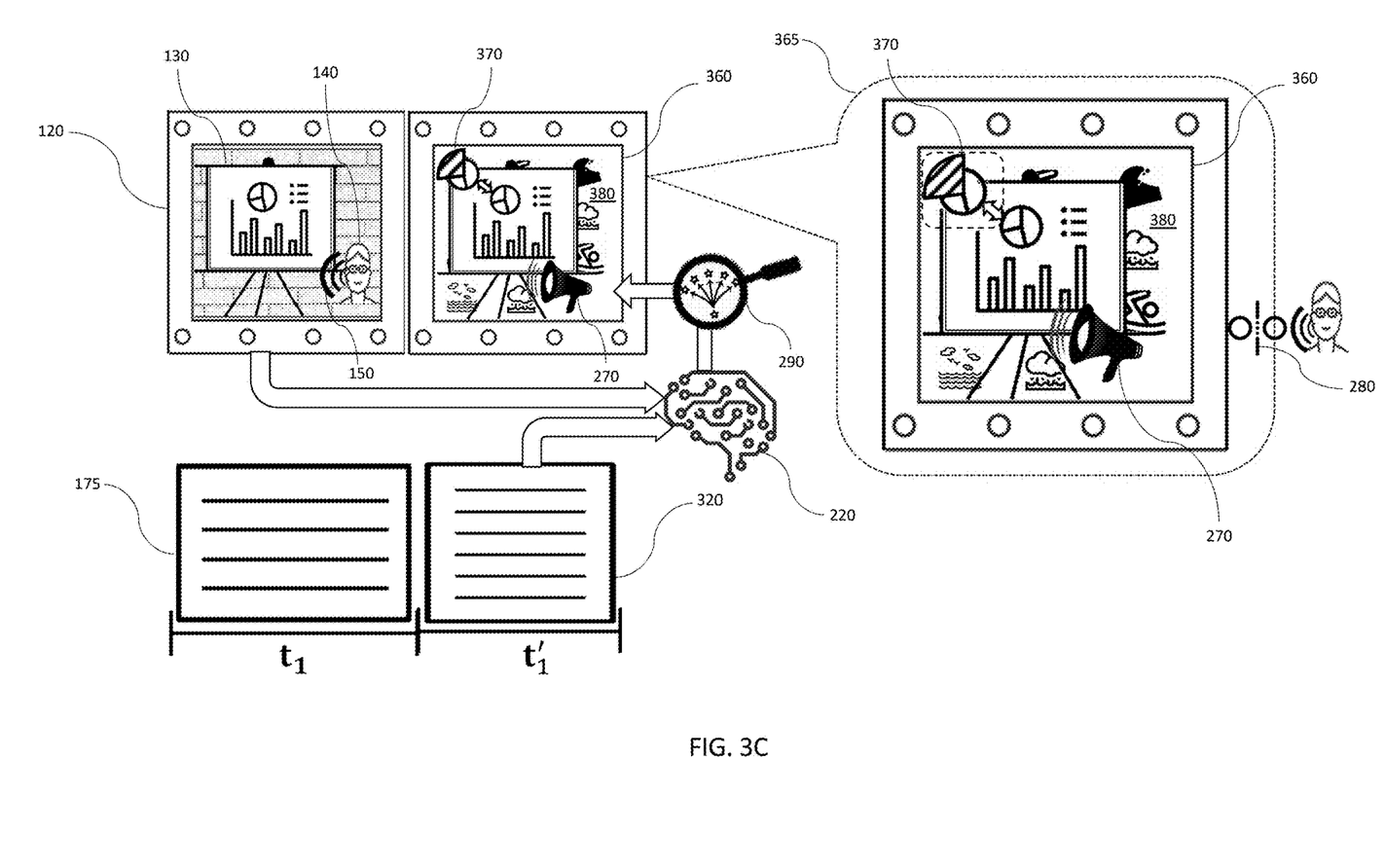

FIG. 3C is a schematic illustration of an audio-visual augmentation 360 associated with an audio extension and containing a slide markup and a new background (the audio-visual augmentation 360 is shown enlarged as an item 365). The fragment 120 contains the slide 130, live images of the presenter 140 and audio of presenter talk 150 used to produce the full transcription 175, which is extended with the additional text 320; the additional text 320 is processed by the GenAI component 220 to generate the audio extension portion 270 using the voice emulation component 280.

By processing the fragment 120 and the additional text 320, the GenAI component 220 may suggest and, upon presenter approval (not shown in FIG. 3C) or automatically, direct the visual augmentation component 290 to add two new visual objects to the audio-video augmentation 360: a slide markup 370 and a background 380.

The slide markup 370 showing an enlarged pie chart and sectors of the enlarged pie chart may appear static throughout the audio extension portion 270 or may be changing its appearance in conjunction with the content of the new portion 320 of the presenter talk. Thus, different sectors of the pie chart may appear enlarged and accompanied by various visual effects as they are mentioned in the audio extension portion 270. The background 380 may be static or dynamic and may change as the extended talk 270 progresses, visually illustrating certain aspects of the audio-visual augmentation 360 and/or a whole augmented presentation fragment corresponding to the fragment 120 and the audio-visual augmentation 360.

Figure 4:
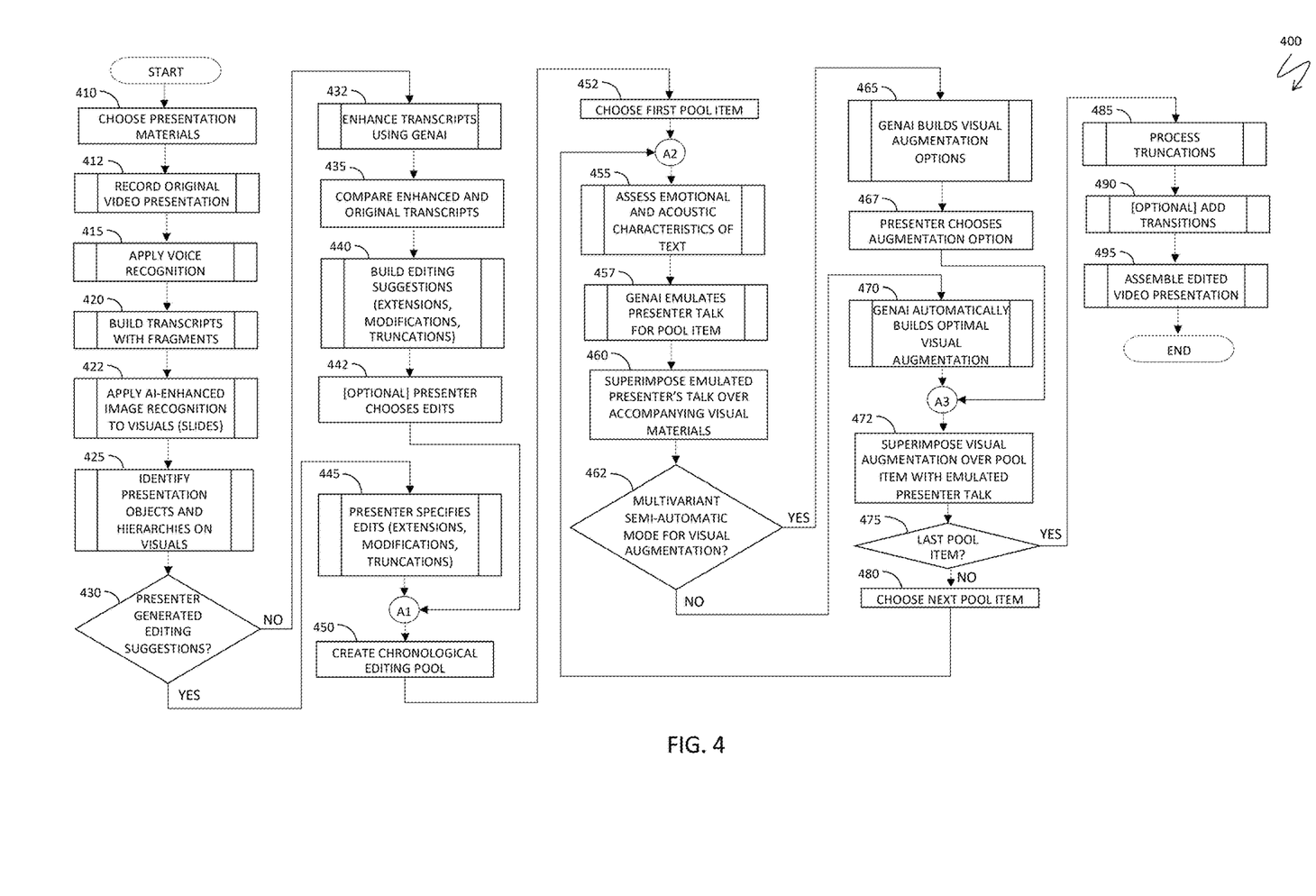
FIG. 4 is a system flow diagram illustrating system functioning in connection with editing video with GenAI driven text-to-voice modifications and visual augmentation, according to an embodiment of the system described herein.

Referring to FIG. 4, a system flow diagram 400 illustrates system functioning in connection with editing video with GenAI driven text-to-voice modifications and visual augmentation. Processing begins at a step 410, where the presentation materials are chosen. After the step 410, processing proceeds to a step 412, where the presenter (or a group of presenters) records an original video presentation. After the step 412, processing proceeds to a step 415, where the system voice recognition component is applied to the recording of the speech of the presenter. After the step 415, processing proceeds to a step 420, where the system builds transcripts with the fragments, as explained elsewhere herein (see, for example, FIG. 1 and the accompanying text). After the step 420, processing proceeds to a step 422, where the AI-enhanced image recognition is applied to the slides or other visuals, as explained elsewhere herein (see Section 3a of the Summary). After the step 422, processing proceeds to a step 425, where presentation objects and hierarchies are identified on slides and other visuals (see Section 3a of the Summary and FIG. 5 for more information).

After the step 425, processing proceeds to a test step 430, where it is determined whether the presenter has generated editing suggestions. If not, processing proceeds to a step 432, where the fragments of transcripts built at the step 420 are modified and enhanced using the GenAI component of the system. After the step 432, processing proceeds to a step 435, where the enhanced versions of the transcripts are compared with the original transcripts. After the step 435, processing proceeds to a step 440, where the system builds editing suggestions (extensions, modifications, and truncations) as explained in Sections 2, 3d of the Summary. After the step 440, processing proceeds to an optional step 442, where the proposed editing suggestions are described to the presenter, and the presenter chooses a subset of edits for implementation. After the step 442, processing proceeds to a step 450, where the system creates a chronological pool of extensions and modifications.

After the step 450, processing proceeds to a step 452, where the first pool item is chosen. After the step 452, processing proceeds to a step 455, where the GenAI system component uses embedded technologies (such as sentiment recognition) to assess projected emotional and acoustic characteristics of the additional text of the current pool item (extension or modification) consistent with the original presentation (see Section 4 of the Summary). After the step 455, processing proceeds to a step 457, where the GenAI component of the system uses the voice emulation subcomponent to emulate the talk of the presenter for the current pool item. After the step 457, processing proceeds to a step 460, where the emulated audio of the presenter talk is superimposed over the accompanying visual materials (if any). After the step 460, processing proceeds to a test step 462, where it is determined whether the current system settings are using a multivariant semi-automatic mode for visual augmentation. If so, processing proceeds to a step 465, where the GenAI component builds and proposes one or multiple options for visual augmentation. After the step 465, processing proceeds to a step 467, where the presenter chooses a visual augmentation option (or accepts the augmentation option in case there is a single option). After the step 467, processing proceeds to a step 472, where the visual augmentation is superimposed over the pool item with the emulated presenter talk (see FIGS. 3A-3C and the accompanying texts).

After the step 472, processing proceeds to a test step 475, where it is determined whether the current pool item is the last item in the pool. If so, processing proceeds to a step 485, where the truncations of the presentation fragments are processed (see Section 3d (ii) of the Summary, and FIG. 2 with the accompanying text for details). After the step 485, processing proceeds to a step 490, where the transitions between the original (unedited) and the edited fragments of the presentations are optionally added. After the step 490, processing proceeds to a step 495, where the edited video presentation is assembled. After the step 495, processing is complete.

If it is determined at the test step 475 that the current pool item is not the last item in the pool, processing proceeds to a step 480, where the next pool item is chosen. After the step 480, processing proceeds to the step 455, which may be independently reached from the step 452.

If it is determined at the test step 462 that current system settings are not using a multivariant semi-automatic mode for visual augmentation, processing proceeds to a step 470, where the GenAI component automatically builds an optimal visual augmentation. After the step 470, processing proceeds to the step 472, which may be independently reached from the step 470.

If it is determined at the test step 430 that the presenter generated editing suggestions, processing proceeds to a step 445, where the presenter (or a group of presenters) specifies the edits (extensions, modifications, truncations). After the step 445, processing proceeds to a step 450, which may be independently reached from the step 442.

Figure 5:
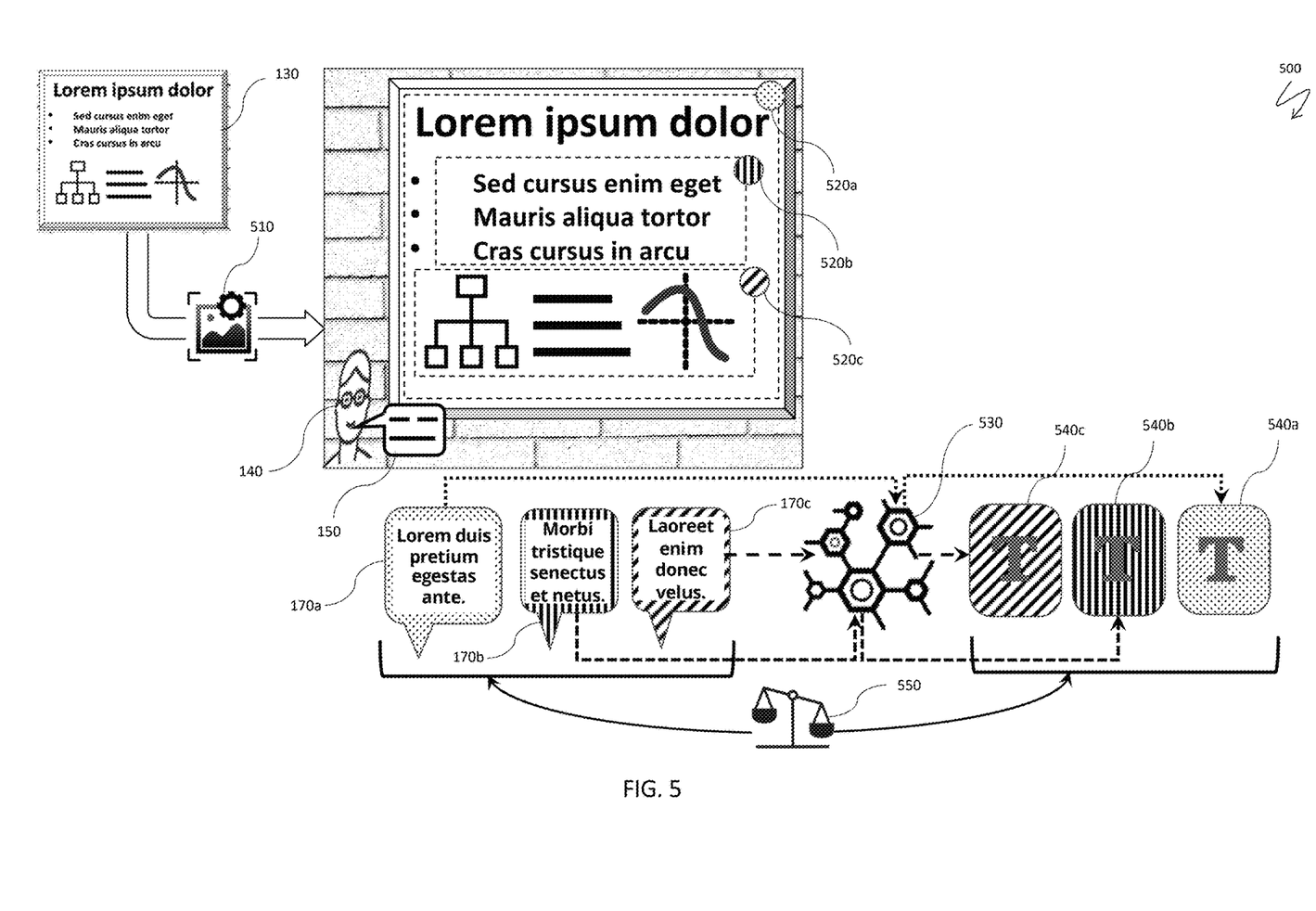
FIG. 5 is a schematic illustration of building editing suggestions, according to an embodiment of the system described herein.

FIG. 5 is a schematic illustration of 500 of building editing suggestions. A slide 130 from the original presentation (see FIG. 1 and the accompanying text) is processed by an AI-enhanced image recognition technology component 510 (which may be a portion of the GenAI component). Presentation objects (text in different formats, charts, graphs, photos, tables, etc.) are identified on the slide 130 and assigned to different levels of a hierarchical presentation structure of the slide, marked in FIG. 5 by circles with different filling patterns: a highest level 520a is the slide as a whole, a first subordinate level 520b is a bullet point text, explaining the key presentation information revealed by the slide; a second subordinate level 520c is a set of graphical illustrations and a text snippet. The second subordinate level 520c may be subordinate to the level 520b or may be at a same level with the level 520b and a direct subordinate of the level 520a.

The presenter 140 records the talk 150, which is processed by the system (the STT technology) and transcribed into a set of fragments. The three fragments 170a, 170b, 170c are showing text snippets explaining different levels of the presentation hierarchy in the recorded video, as highlighted by the filling patterns of the fragments 170a-170c consistent with the notations of the levels 520a, 520b, 520c.

An LLM (Large Language Model) or an LLM+RAG (Retrieval-Augmented Generation) component 530 of the GenAI engine is applied to each fragment, creating enhanced versions of fragments 540a-540c. Each of the enhanced versions 540a-540c is compared with corresponding ones of the original fragments 170a-170c, as illustrated by a comparison component 550. The differences and additional processing of the original fragments 170a-170c are used to produce editing suggestions, as explained in detail in Section 4 of the Summary.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Further, various aspects of the system described herein may be deployed on various devices, including, but not limited to wearable devices, smartphones, tablets and other mobile computers. Mobile devices may use operating system(s) selected from the group consisting of: IOS, Android OS, Windows Phone OS, Blackberry OS and mobile versions of Linux OS. Certain components of the system may be cloud based and interact with mobile computers.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of using generative AI to modify a video presentation, comprising:
    using a speech-to-text component to provide a transcript of fragments of the video presentation;
    the generative AI reviewing the transcript of fragments to provide improvements that enhance the consistency, style, content, and expressive qualities of fragments from the transcript of fragments;
    the generative AI creating adjustments of an audio portion of the video presentation based on the improvements, the adjustments including at least one of: modifications to at least some text of the transcript of fragments, truncation of at least some of the text of the transcript of fragments, or new text that is added to the text of the transcript of fragments, the new text and the modifications to text being provided using synthesized speech that emulates emotional and acoustic aspects of speech of a presenter of the video presentation;
    providing a modified video presentation by performing at least one of: inserting the synthesized speech into the video presentation, replacing audio corresponding to at least one fragment of the transcript of fragments with the synthesized speech, or deleting at least at least a portion of the audio of the at least one fragment of the transcript of fragments; and
    the generative AI supplementing the modified video presentation with one or more visual augmentations.

2. The method of claim 1, wherein the presenter provides suggestions for some of the improvements.

3. The method of claim 1, wherein the visual augmentations include an image of the presenter.

4. The method of claim 3, wherein the image of the presenter is static or dynamic.

5. The method of claim 3, wherein the image of the presenter includes at least one of: characteristic posture, facial expression, or gesture.

6. The method of claim 1, wherein at least some of the visual augmentations provide additional text.

7. The method of claim 6, wherein the additional text is an animated text line that is synchronized with a corresponding portion of the modified video presentation.

8. The method of claim 1, wherein the visual augmentations include an enlarged version of a slide provided in the modified video presentation.

9. The method of claim 8, wherein the enlarged version of the slide corresponds to zooming in certain portions of the slide.

10. The method of claim 1, wherein the visual augmentations include at least one of: zooming out all slides of the modified video presentation, highlighting portions of materials of the modified video presentation, or marking up the portions of the materials of the modified video presentation.

11. The method of claim 1, wherein the visual augmentations include a marked-up version of a slide provided in the modified video presentation.

12. The method of claim 1, wherein the visual augmentations include at least one of: a dynamic background that changes, changing color effects, or changing foreground imagery.

13. The method of claim 1, wherein the adjustments include the generative AI replacing a particular fragment of the transcript in response to a selected metric of semantic difference between a corresponding one of the improvements and the particular fragment of the transcript exceeding a predefined threshold.

14. The method of claim 13, wherein the selected metric of semantic difference corresponds to a distance in a metric vector space between vector embeddings of the particular fragment and the corresponding one of the improvements exceeding a length of a vector embedding of the particular fragment by at least 20%.

15. The method of claim 1, wherein the adjustments include deleting at least a portion of a fragment of the transcript of fragments that is proximal to an other fragment of the transcript of fragments that contains an other portion with similar information.

16. The method of claim 1, wherein the adjustments include deleting at least a portion of a fragment of the transcript of fragments that contains textual errors.

17. The method of claim 16, wherein the textual errors include incomplete phrases.

18. The method of claim 1, wherein the adjustments include adding at least one fragment to the transcript of fragments that includes a brief summary of one or more other ones of the fragments of the transcript of fragments.

13

19. The method of claim 1, wherein the adjustments include adding at least one fragment to the transcript of fragments that includes expanding object explanations of one or more other ones of the fragments of the transcript of fragments.

20. A non-transitory computer readable medium containing software that, when executed by a processor, uses generative AI to modify a video presentation, the software comprising:

executable code that uses a speech-to-text component to provide a transcript of fragments of the video presentation;

executable code that uses the generative AI to review the transcript of fragments to provide improvements that enhance the consistency, style, content, and expressive qualities of fragments from the transcript of fragments;

executable code that uses the generative AI to create adjustments of an audio portion of the video presentation based on the improvements, the adjustments including at least one of: modifications to at least some text of the transcript of fragments, truncation of at least some of the text of the transcript of fragments, or new text that is added to the text of the transcript of fragments, the new text and the modifications to text being provided using synthesized speech that emulates emotional and acoustic aspects of speech of a presenter of the video presentation;

executable code that provides a modified video presentation by performing at least one of: inserting the synthesized speech into the video presentation, replacing audio corresponding to at least one fragment of the transcript of fragments with the synthesized speech, or deleting at least at least a portion of the audio of the at least one fragment of the transcript of fragments; and     executable code that uses the generative AI to supplement the modified video presentation with one or more visual augmentations.

\* \* \* \* \*